United States Patent

[11] 3,576,327

[72] Inventor Marvin P. Young
 Alexandria, Va.
[21] Appl. No. 821,751
[22] Filed May 5, 1969
[45] Patented Apr. 27, 1971
[73] Assignee the United States of America as represented by the Secretary of the Navy.

[54] INFLATABLE SEAL FOR FLUID-CONTAINING MEANS
 6 Claims, 4 Drawing Figs.
[52] U.S. Cl. .................................................. 277/34.3, 277/226
[51] Int. Cl. ................................................... F16j 15/46
[50] Field of Search ........................................... 277/3, 16, 34, 34.3, 34.6, 73, 79, 126, 226

[56] References Cited
UNITED STATES PATENTS

| | | | |
|---|---|---|---|
| 2,099,722 | 11/1937 | Byers | 277/34X |
| 2,822,192 | 2/1958 | Beatty | 277/34X |
| 2,615,741 | 10/1952 | Nathan | 277/226X |
| 2,814,514 | 11/1957 | Beatty | 277/226X |
| 3,236,544 | 2/1966 | Brown | 277/226X |
| 3,294,243 | 12/1966 | Cerles | 277/34.3X |
| 2,226,304 | 12/1940 | Dillon | 277/226X |

Primary Examiner—Laverne D. Geiger
Assistant Examiner—Robert I. Smith
Attorneys—R. S. Sciascia, R. L. Branning and M. L. Crane ABSTRACT: This disclosure is directed to a seal including a flexible O-ring housing which creates a uniform pressure for compression of an O-ring at all points along the surface to be sealed. The surface need not be concentric and may vary in diameter because equal pressure will be applied onto the O-ring by a fluid within a circular cavity within the housing near the O-ring. The fluid in the cavity will apply equal pressure onto the O-ring so that the O-ring conforms to the shape of the surface sealed. The O-ring may be on the outer surface or inner surface of the seal body depending on the position of the cavity within the housing relative to the O-ring. This seal is suitable for a high vacuum system and may be made of an insulating material.

PATENTED APR 27 1971

INVENTOR
MARVIN P. YOUNG

BY *Melvin L Crane* AGENT

*R Hiasci* ATTORNEY

INVENTOR
MARVIN P. YOUNG 3,576,327

INFLATABLE SEAL FOR FLUID-CONTAINING MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to fluid pressure seals and more particularly to a fluid pressure seal which applies a uniform pressure onto an O-ring for sealing along a cylindrical surface which may be nonconcentric.

Heretofore, fluid seals have been provided wherein fluid forces a portion of the seal member against the surface to be sealed. These seals require uniform cylindrical surfaces to make a good seal without leaks. These prior art seals are usually formed with the pressure cavity within an expandable material which is backed by a rigid structure, a clamp or another material of a nonexpanable-type in order to hold the pressure seal in place against the surface to be sealed.

SUMMARY OF THE INVENTION

This invention is directed to a cylindrical flexible housing or body made of an insulating material which includes therein a cavity near one wall surface which is provided with an O-ring on the surface in the vicinity of the cavity. Fluid forced into the cavity applies equal pressure on all points of the O-ring to force the O-ring against a cylindrical surface. The housing may be provided with two spaced cavities formed in cylindrical portions of different diameter to apply a seal on the outer surface of two different diameter tubes or cylinders to seal the area confined between the two cylinders. This seal provides uniform pressure on the O-ring regardless of concentricity tolerances. Therefore, cylinders or tubes need not be perfectly round. The seal is useful to provide high-voltage insulation and is easily slid onto and off the tubes when the seal is in a deflated condition. Such a seal may be used in magnetic compression experiments relating to controlled thermonuclear research which requires a high vacuum, high voltage, and high temperatures.

STATEMENT OF THE OBJECTS

It is therefore an object of the present invention to provide a pressure-type seal which creates a uniform pressure onto an O-ring seal.

Another object is to provide a pressure seal which is useful for nonuniform cylindrical members.

Still another object is to provide a seal which is easily installed and removed, when desired.

Yet another object is to provide a pressure-type O-ring seal which is made of a good insulation material.

Other and more specific objects of this invention will become apparent upon a careful consideration of the following detailed description.

DESCRIPTION OF THE PREFERRED EMBODIMENTS

Figure 1:
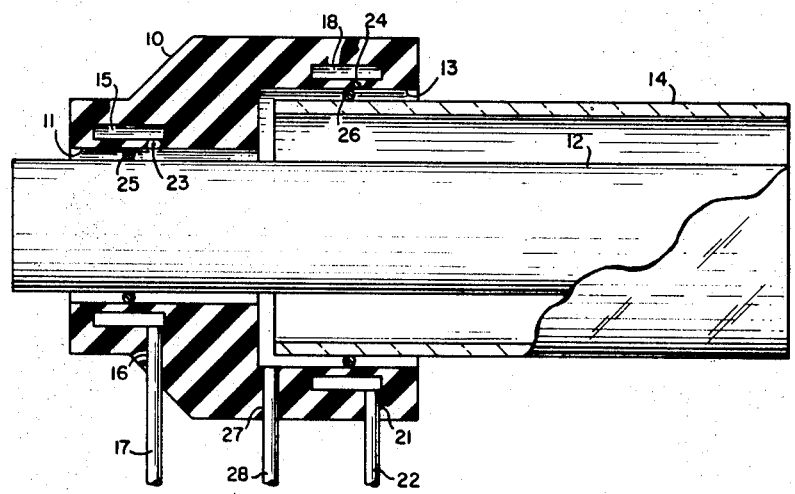
FIG. 1 illustrates a cross-sectional view of a pressure seal for sealing coaxially arranged tubular members which permits evacuation of the area between the tubular members.

Now referring to the drawing, there is illustrated in FIG. 1 an O-ring pressure seal suitable for sealing coaxially arranged cylinders or tubular members to prevent leakage in the area between the cylinders. The sealing means includes a body 10 made of urethane or some other such suitable flexible material which has an aperture 11 of sufficient diameter for the inner tube or cylinder 12 to pass coaxially therethrough and a larger diameter section having a cylindrical section 13 extending axially to receive therein the end of a larger tube or cylinder 14. The section of the body including the aperture 11 is provided with a cylindrical uniform cavity 15 therein with a passage 16 extending from the cavity to the outside to which a pressure line 17 is connected for supplying a fluid (liquid or air) to the cavity. The larger diameter section includes therein a cylindrical uniform cavity 18 with a passage 21 extending from the cavity to the outside to which a pressure line 22 is connected for supplying the fluid (liquid or air) to the cavity. Each of the cavities are formed such that the thickness of the housing 23 and 24 between the cavity and the inner diameter surface is much thinner than that portion of the housing radially outwardly of the cavity. Adjacent each of the cavities 15 and 17, between the inner surface of the housing and the tubular members, is found O-ring 25 and 26. The housing is also provided with a passage 27 therethrough which extends into the larger diameter end area near the end of tubular member 14. A line 28 is connected to passage 27 for evacuating the area confined between the tubular members 12 and 14.

When in a deflated condition the seal will slide over the ends of the tubular members until in position, as shown. Fluid is applied to each of the cavities under pressure thereby forcing the thin walls of each of the cavities against the O-rings. The pressure applied in the cavity will exert equal pressure on all points along each of the O-rings thereby forcing the O-rings against the outer surface of the respective tubular members. Once the fluid has been admitted to each of the cavities under pressure forcing the O-ring against the surface of its respective tubular members, the area between the two tubular members may be evacuated by use of a vacuum pump connected with the evacuation line. Since pressure is applied uniformly onto the O-rings, the O-rings will be forced against the outer surface of the tubular members and make a positive seal even though the tubular members may not be perfectly round.

Figure 2:
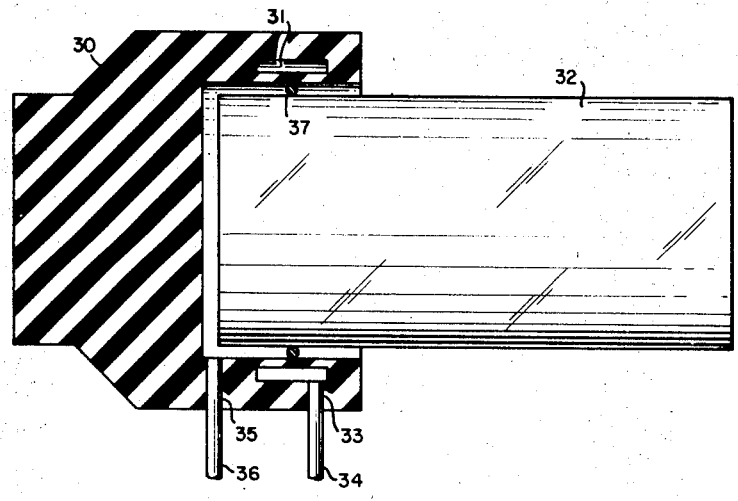
FIG. 2 illustrates an O-ring pressure seal for a single cylinder or tubular member.

FIG. 2 illustrates a pressure seal 30 similar to that shown by FIG. 1 except there is only one fluid cavity 31 in the cylindrical end that extends over the end of a tubular member 32. The housing is provided with a passage 33 to the cavity 31 which is connected with a fluid pressure line 34. The outer end of the housing is closed in order to close off the tubular member. A passage 35 that extends through the housing to the inner surface of the cylindrical end connects with a line 36 in order to evacuate the system, if desired. If evacuation is not required the seal may be made without the evacuation line. An O-ring 37 is provided to seal the area between the cylindrical end of the seal and the tubular member. The O-ring is pressed against the tubular member in the same manner as described for the O-ring seal of FIG. 1.

Figure 3:
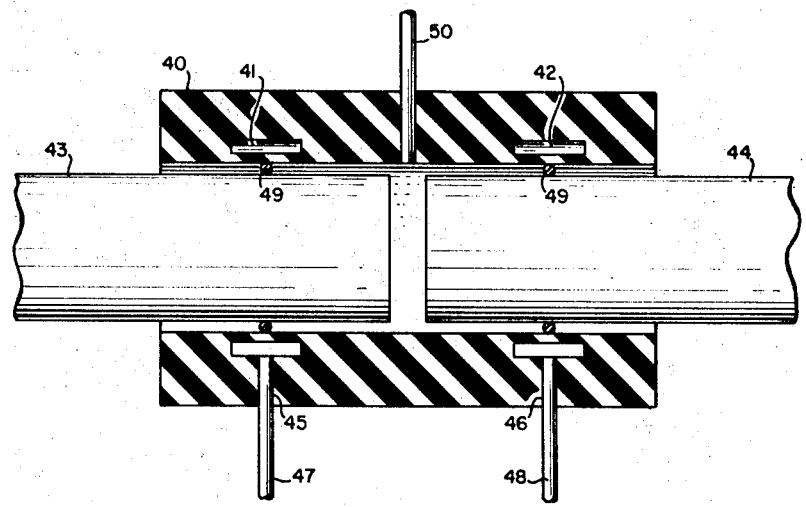
FIG. 3 illustrates an O-ring pressure seal suitable for securing two cylinders in end-to-end alignment.

FIG. 3 illustrates a tubular seal member 40 which is provided with two spaced cavities 41 and 42, therein which may be used to seal the ends of separate aligned tubular members 43 and 44. The seal is provided with passages 45 and 46 therein which extend to the respective cavities for connecting with respective pressure line 47 and 48. An O-ring 49 is positioned opposite each of the cavities around the tubular members for sealing the spacing between the seal and the tubular members when fluid pressure is applied to the cavities. The coupling seal is shown with a passage to the outside connected with tubular member 50 for the purposes of evacuating the tubular members, if desired.

Figure 4:
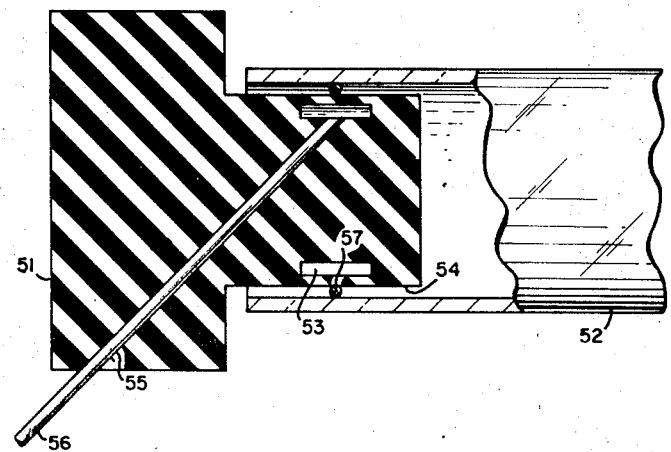
FIG. 4 illustrates an O-ring pressure seal for sealing against the inner surface of a tubular member.

FIG. 4 illustrates a pressure seal 51 which seals against the inner surface of a tubular member 52. The seal 52 is provided with a cylindrical uniform cavity 53 within an end 54 of the seal that extends into the tubular member 52. A passage 55 within the seal connects the cavity 53 to a pressure line 56 through which fluid under pressure is applied to the cavity 53. The thin wall of the cavity is forced against O-ring 57 in order to seal the area between the tubular member and the end 54 of the pressure seal. Release of the fluid pressure relaxes the O-ring and the seal may be easily removed from the end of the tubular member.

The above-described seal members apply a uniform pressure against an O-ring so that the O-ring is forced against a surface to be sealed. The O-ring may be made a part of the seal or may be a separate element which is used in operation with the seal. Since the O-ring is deformed by uniform pressure on its entire circumferential area, the O-ring will be forced against nonconcentric surfaces to provide a positive seal.

The device as shown by FIG. 1 may be used to carry out plasma research. In this case, the center tubular member may be a conductor. Therefore, the seal would also operate as an insulator.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

I claim:

1. A pressure seal for sealing a spacing between said seal and a fluid-containing means positioned relative thereto; which comprises:
    a body;
    said body made of a flexible material;
    at least one cylindrical cavity of uniform size within said body;
    said cavity lying within said body near one wall surface such that the thickness of the body portion between said cavity and one wall is of uniform thickness and much thinner than the body portion from said cavity to the opposite wall surface of said body,
    an O-ring;
    said O-ring juxtaposed said thin body portion formed by said cavity and lying along the wall surface of said fluid-containing means;
    a fluid passage in said body connected with said cavity for admitting a fluid under pressure to said cavity in said body; and
    whereby pressure applied within said cavity forces said O-ring in sealing contact with a fluid-containing means positioned relative to said pressure seal.

2. A pressure seal as claimed in claim 1, wherein,
    said body is cylindrical, and
    said cavity within said body is near the outer surface of said body and coaxial therewith.

3. A pressure seal as claimed in claim 1, wherein,
    said body is tubular, and
    said cavity within said body is near the inner wall of said body and coaxial with said body.

4. A pressure seal as claimed in claim 3, wherein, said tubular body includes at least two spaced cavities within said body.

5. A pressure seal as claimed in claim 4, wherein,
    said body includes at least two body sections of different diameter, and
    a cavity within each different diameter body section.

6. A pressure seal as claimed in claim 1, in which, said body includes a passage therein for evacuating said body which is sealed by said pressure seal.